(12) United States Patent
Smith et al.

(10) Patent No.: US 9,493,178 B2
(45) Date of Patent: Nov. 15, 2016

(54) CHILD SUPPORT APPARATUS (71) Applicant: Mamas & Papas (Holdings) Ltd., Yorkshire (GB)

(72) Inventors: Peter Smith, Leeds (GB); Nichola Hargreaves, Bradford (GB); Stephen Redfern, W. Yorkshire (GB)

(73) Assignee: Mamas & Papas (Holdings) Ltd., Huddersfield (GB)

( * ) Notice: Subject to any disclaimer, the term of this patent is extended or adjusted under 35 U.S.C. 154(b) by 0 days.

(21) Appl. No.: 14/452,987

(22) Filed: Aug. 6, 2014

(65) Prior Publication Data

US 2015/0042075 A1 Feb. 12, 2015

(30) Foreign Application Priority Data

Aug. 6, 2013 (GB) .................................. 1314028.0

(51) Int. Cl.
*B62B 7/00* (2006.01)
*B62B 7/14* (2006.01)
(Continued)

(52) U.S. Cl.
CPC .............. *B62B 7/145* (2013.01); *B62B 7/062* (2013.01); *B62B 7/142* (2013.01); *B62B 9/104* (2013.01); *B62B 7/064* (2013.01)

(58) Field of Classification Search
CPC ............ B62B 9/10; B62B 9/102; B62B 9/104; B62B 9/12; B62B 7/00; B62B 7/006; B62B 7/04; B62B 7/06; B62B 7/062; B62B 7/064; B62B 7/066; B62B 7/08; B62B 7/083; B62B 7/10; B62B 7/14; B62B 7/142; B62B 7/145; B62B 7/147
See application file for complete search history.

(56) References Cited

U.S. PATENT DOCUMENTS 6,513,827 B1 * 2/2003 Barenbrug .............. B62B 7/147
280/643
6,530,591 B2 * 3/2003 Huang .................... B62B 7/123
280/47.38

(Continued)

FOREIGN PATENT DOCUMENTS

CN 2752129 1/2006
CN 201646813 11/2010
(Continued)

*Primary Examiner* — James M Dolak
(74) *Attorney, Agent, or Firm* — Gordon & Jacobson, P.C.

(57) ABSTRACT

A foldable child support apparatus including a seat with a seat back pivotal relative to a seat base between at least one open condition for seating a child when the apparatus is unfolded and a closed condition when the apparatus is folded. A frame is provided including a handle member and front and rear leg members, which pivot about at least one frame pivot between an unfolded condition in which the handle member and the front leg members extend on generally opposite sides of the pivot and a folded condition in which the frame members are located on the same side of the pivot with the front leg members located between the handle member and rear leg members. The frame is arranged to transfer the seat between a forward facing unfolded position and a forward facing folded position and vice versa.

19 Claims, 10 Drawing Sheets

(51) Int. Cl.
  *B62B 7/06*    (2006.01)
  *B62B 9/10*    (2006.01)

(56) References Cited

U.S. PATENT DOCUMENTS

| | | | | |
|---|---|---|---|---|
| 7,377,537 B2* | 5/2008 | Li | ............................ | B62B 7/123 |
| | | | | 280/47.38 |
| 7,798,500 B2 | 9/2010 | De Boer | | |
| 8,087,689 B2* | 1/2012 | Fritz | ......................... | B62B 7/062 |
| | | | | 280/647 |
| 8,366,127 B2* | 2/2013 | Zhong | ..................... | B62B 7/123 |
| | | | | 280/47.4 |
| 8,376,375 B2* | 2/2013 | Mival | ........................ | B62B 7/08 |
| | | | | 280/47.25 |
| 8,398,111 B2* | 3/2013 | Mival | ........................ | B62B 7/08 |
| | | | | 280/648 |
| 8,585,063 B2* | 11/2013 | Chen | ........................ | B62B 9/104 |
| | | | | 280/47.38 |
| 8,596,669 B2* | 12/2013 | Liao | ........................... | B62B 7/08 |
| | | | | 280/47.38 |
| 8,616,638 B2* | 12/2013 | Zeng | ........................ | B62B 9/104 |
| | | | | 297/183.1 |
| 8,668,222 B2* | 3/2014 | Chen | ........................... | B62B 7/08 |
| | | | | 280/47.38 |
| 9,085,312 B2* | 7/2015 | Liu | ............................ | B62B 7/08 |
| 9,168,939 B2* | 10/2015 | Gu | ............................ | B62B 9/203 |
| 9,193,374 B2* | 11/2015 | Dorca | ..................... | B62B 9/104 |
| 9,221,487 B2* | 12/2015 | Doucette | .................. | B62B 7/00 |
| 9,260,128 B2* | 2/2016 | Liu | ............................ | B62B 7/08 |
| 9,326,618 B2* | 5/2016 | Zhong | ..................... | A47D 13/02 |
| 9,346,479 B1* | 5/2016 | Ransil | ........................ | B62B 7/08 |
| 2010/0314855 A1 | 12/2010 | Mival et al. | | |
| 2011/0068549 A1 | 3/2011 | Chen | | |
| 2011/0175406 A1 | 7/2011 | Zeng | | |
| 2011/0241313 A1 | 10/2011 | Homan et al. | | |
| 2011/0266762 A1 | 11/2011 | Chen | | |

FOREIGN PATENT DOCUMENTS

| | | |
|---|---|---|
| CN | 202541612 | 11/2012 |
| CN | 202574327 | 12/2012 |
| GB | 2430414 | 3/2007 |
| GB | 2744035 | 7/2011 |
| WO | WO 02/20330 | 3/2002 |
| WO | WO 2008/142082 | 11/2008 |

\* cited by examiner

CHILD SUPPORT APPARATUS

CROSS-REFERENCE TO RELATED APPLICATIONS

The present application claims priority from GB Patent Appl. No. 1314028.0, filed on Aug. 6, 2013, herein incorporated by reference in its entirety.

BACKGROUND

1. Field

The present invention relates to a child support apparatus which can be folded.

2. State of the Art

Child support apparatus such as buggies, pushchairs, prams and highchairs typically comprise a seat for seating a child and a frame on which the seat is mounted. The apparatus has an unfolded condition in which the apparatus is used and a folded condition in which it is reduced in size for storage or transportation. In some cases the seat is removed from the frame prior to folding and the frame collapsed or folded without the seat. In other cases the seat and the frame are folded whilst attached to one another. Buggies and pushchairs of this latter type which are currently on the market either have an unduly large size when in the folded condition or have an awkward shape rendering them inconvenient to store and transport. In particular, the way in which the seat is folded and positioned within the frame is not ideal.

Some buggies or pushchairs have a seating arrangement in which the seat can be orientated in a forward facing direction or a rearward facing direction according to the wishes of a parent or care giver. It is often the case with pushchairs of this type that folding may take place only when the seat is in the forward facing orientation. If the seat is in the rearward facing orientation, then prior to folding, it must first be removed and placed in the forward facing orientation. Some pushchairs of this type allow folding in the rearward facing orientation but the fold is noticeably worse in the rearward facing orientation than the forward facing orientation. In this regard, the rearward facing fold may be difficult to carry out, or the size or shape of the folded pushchair is larger or bulky when folded from a rearward facing orientation in comparison to a fold from the forward facing orientation.

There are currently only two pushchairs on the market which offer forward and rearward facing seating orientations where the fold in the rearward facing orientation is comparable to the fold in the forward facing orientation. The known buggies are the Baby Jogger® City Versa and the Bugaboo® Bee.

SUMMARY

The present invention seeks to provide an improved foldable child support apparatus.

The present invention provides a foldable child support apparatus comprising: a seat having a seat back pivotal relative to a seat base between at least one open condition for seating a child when the apparatus is unfolded and a closed condition when the apparatus is folded; a frame comprising a handle member and front and rear leg members, the frame members being pivotal about at least one frame pivot between an unfolded condition in which the handle member and the front leg members extend on generally opposite sides of the pivot and a folded condition in which the frame members are located on the same side of the pivot with the front leg members located between the handle member and rear leg members; the frame being arranged to support the seat in a forward facing orientation and a rearward facing orientation and to transfer the seat between a forward facing unfolded position and a forward facing folded position and between a rearward facing unfolded position and a rearward facing folded position of the seat.

The seat back may be pivotal relative to the seat base about a seat pivot and the seat pivot is located below said at least one frame pivot when the apparatus is unfolded and in normal use.

In this aspect, there may be provided a carriage pivotally mounted to the frame about a carriage pivot for mounting the seat to the frame in forward facing and rearward facing orientations, the carriage pivot being located below said at least one frame pivot when the apparatus is unfolded and in normal use.

The carriage pivot may be fixed relative to the front leg members and may be located on struts extending rearwards from respective front leg members.

The carriage may be pivotal to the forward facing folded position or the rearward facing folded position independent from pivotal movement of any one of the frame members relative to another of the frame members.

The handle member and carriage may be pivotal to their respective folded positions whilst the front and rear leg members are maintained in their unfolded positions.

The seat may comprises a seat handle for gripping by a user when the seat is in either the forward facing or rearward facing folded positions wherein lifting the seat by the seat handle when the handle member of the frame is in its folded position causes folding of the front and rear leg members to their folded positions.

The seat handle may be located underneath the seat and when the seat is closed and transferred to either the forward facing or rearward facing folded positions the seat handle is exposed for gripping by user and lifting the seat to fold the frame.

In another aspect, the present invention provides a foldable child support apparatus comprising: a seat for seating a child; a carriage for receiving the seat and mounting the seat to a frame of the apparatus in forward facing and rearward facing orientations of the seat; wherein the carriage is supported by the frame for pivotal movement for transferring the seat between a forward facing unfolded position and a forward facing folded position and between a rearward facing unfolded position and a rearward facing folded position of the seat relative to the frame.

The carriage is supported for pivotal movement independent from the frame. The carriage may be pivotally supported by the frame about a carriage pivot axis so that the carriage is pivotal independent from a position of any one or more member of the frame.

The carriage may have an orientation relative to the frame in the rearward facing folded position of the seat which is inverted relative to an orientation of the carriage in the forward facing folded position of the seat.

The carriage may be pivotal in a forwards direction both from the forward facing unfolded position to the forward facing folded position of the seat and from the rearward facing unfolded position to the rearward facing folded position of the seat.

The carriage may be pivotal by a first smaller angle from the forward facing unfolded position to the forward facing folded position of the seat than a second larger angle by which the carriage is pivotal from the rearward facing unfolded position to the rearward facing folded position of the seat.

The second angle may be between 120 and 180 degrees larger than the first angle.

The seat may comprise a seat base and a seat back pivotal relative to the seat base to open and close the seat and in the forward facing orientation of the seat the seat back is pivotal in the forwards direction to close the seat and in the rearward facing orientation the seat back is pivotal in a rearwards direction to close the seat.

The seat back may be located above the seat base in the forward facing folded position and the seat base is located above the seat back in the rearward facing folded position with respect to an upright orientation of the frame.

A pivotal axis of the seat may be spaced apart from a pivotal axis of the carriage in the radial directions of the axes.

The carriage may comprise a carriage mount co-operable with a seat mount of the seat for mounting the seat to the carriage in forward facing and rearward facing orientations.

In another aspect there is provided a foldable child support apparatus comprising: a seat having a seat back pivotal relative to a seat base between at least one open condition for seating a child when the apparatus is unfolded and a closed condition when the apparatus is folded; a carriage for receiving the seat and mounting the seat to a frame of the apparatus, the carriage being mounted to the frame for pivotal movement for transferring the seat between an unfolded position and a folded position, wherein the carriage is locked to the frame to prevent pivotal movement of the carriage when the seat back is in said at least one open condition.

The carriage may be unlocked from the frame to allow pivotal movement of the carriage to the folded position of the seat when the seat back is moved to the closed condition.

The carriage may comprise a carriage locking mechanism responsive to the position of the seat back relative to the seat base for engaging a frame member for locking the carriage to the frame and for disengaging from the frame member for unlocking the carriage from the frame.

The carriage locking mechanism may comprise a locking member having a locking position for engaging the frame member for locking the carriage to the frame and an unlocking position for disengaging from the frame member for unlocking the carriage from the frame, and the seat comprises a seat locking mechanism for engaging with the carriage locking mechanism for causing movement of the locking member.

Movement of the locking member may be biased by a biasing member and movement of the seat back to close the seat causes the seat locking mechanism to move the locking member in the direction of the bias.

The locking member may be biased towards the unlocking position.

The seat locking mechanism may comprise an actuator member moveable between locking and unlocking positions for transferring movement of the seat back to movement of the locking member of the carriage locking mechanism.

The actuator member may be biased by a biasing member into one of the locking or locking positions and movement of the seat back to the closed position causes the transfer member to move against the bias.

The carriage may be arranged for receiving the seat and mounting the seat to the frame in a forward facing orientation and a rearward facing orientation, and the carriage is locked to the frame to prevent pivotal movement of the carriage when the seat back is in said at least one open condition in the forward facing orientation and the rearward facing orientation.

The seat locking mechanism may be co-operable with the carriage locking mechanism to cause the carriage locking mechanism to engage with the frame member to lock the carriage to the frame when the seat back is in said at least one open condition and to disengage from the frame member when the seat back is in the closed condition to allow pivotal movement of the seat to a forward facing folded position or a rearward facing folded position.

In order that the present invention may be well understood, an embodiment thereof, which is given by way of example only, will now be described with reference to the accompanying drawings.

DETAILED DESCRIPTION OF THE PREFERRED EMBODIMENTS

Referring to FIGS. 1 to 10, a foldable child support apparatus 10 is shown. In the illustrated embodiments the apparatus is a child's buggy or pushchair, sometimes referred to as a pram. The apparatus may alternatively be a high chair or other apparatus for supporting a child in a chair when the apparatus is in use and can be folded for convenient storage or transportation.

Figure 1:
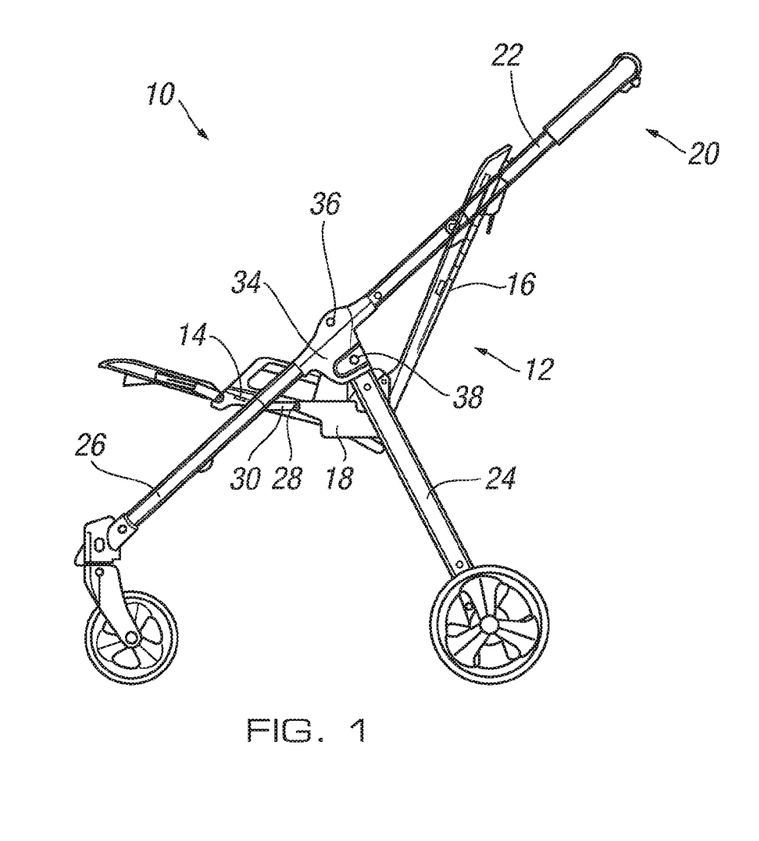
FIGS. 1 to 5 show a child support apparatus with a seat positioned in a forward facing orientation, when folded from its normal condition of use to a folded condition.
Figure 2:
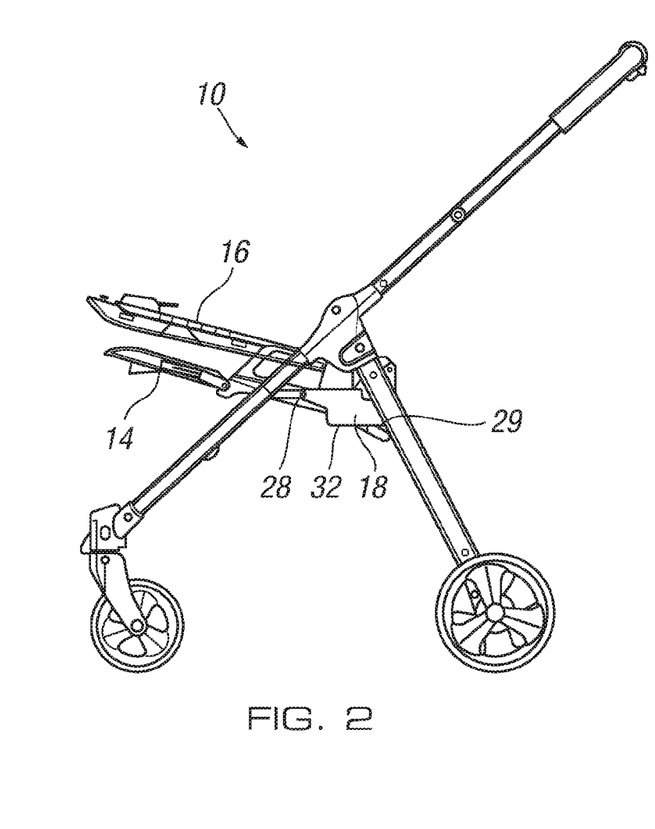

Referring first to FIG. 1, the buggy (or pushchair) 10 comprises a seat 12 for seating a child. The seat comprises a seat base 14 and a seat back 16 pivotal relative to the seat base. A child sits on the seat base whilst the seat back supports the back of a child. Pivotal movement of the seat back opens and closes the seat. The seat is shown in an open condition in FIG. 1 and a closed condition in FIG. 2 in which the seat back has been rotated by about 90° relative to the seat base whilst the seat base remains in a stationary position. FIGS. 1 and 2 show the open and closed conditions of the seat 12 when the seat is in a forward facing orientation. In the forward facing orientation a child in the seat faces the normal direction of travel when the buggy is pushed by a parent or care giver from behind. The forward facing orientation is most often used for children that are older than about 12 months depending on the choice of the parent or care giver.

Figure 6:
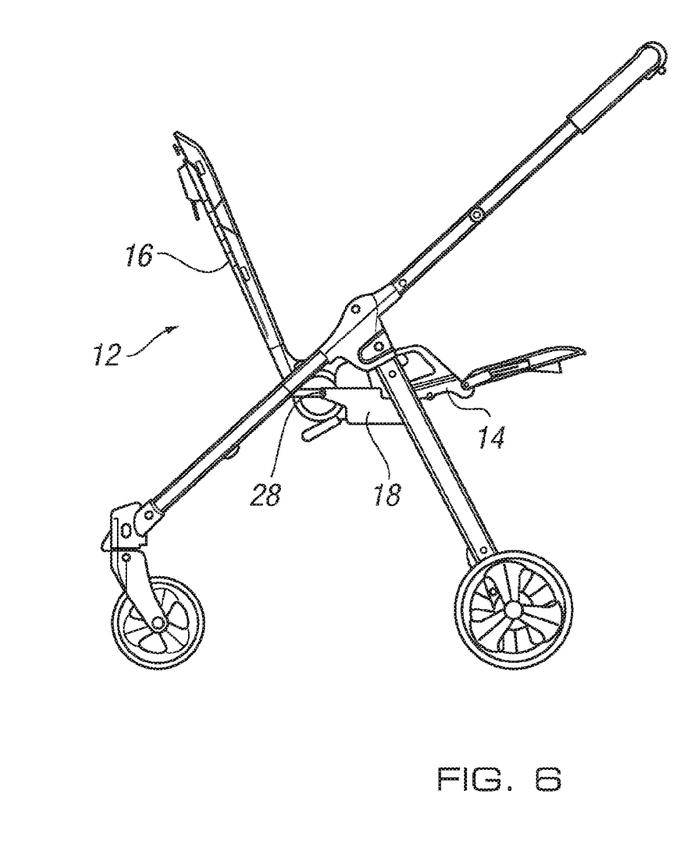
FIGS. 6 to 10 show the child support apparatus in FIGS. 1 to 5 with the seat positioned in a rearward facing orientation, when folded from its normal condition of use to a folded condition.
Figure 7:
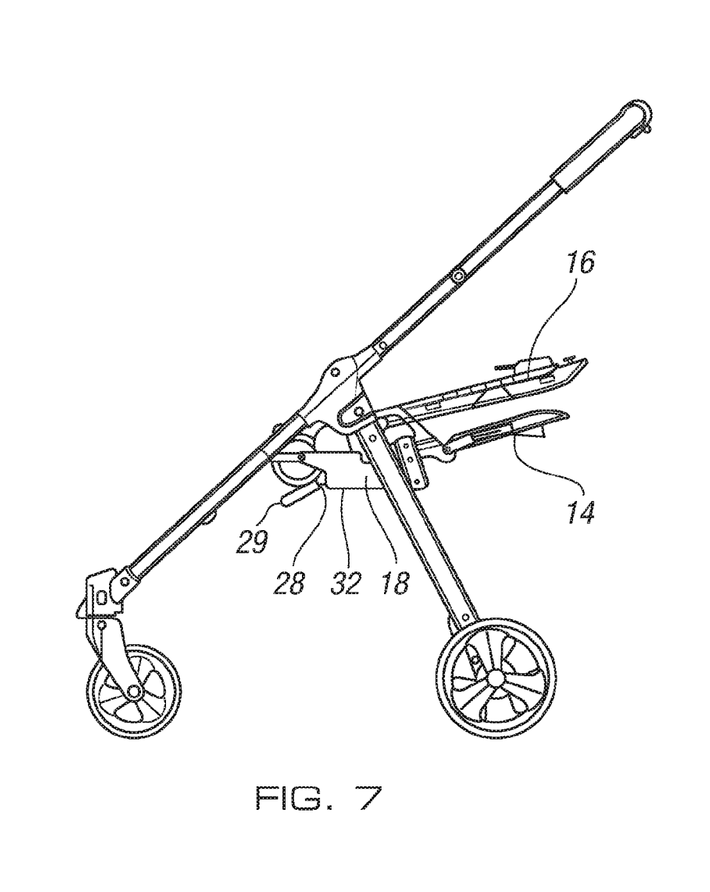

FIGS. 6 and 7 show the seat 12 in open and closed conditions respectively, but in these Figures the seat is in a rearward facing orientation. In the rearward facing orientation, a child seated in the seat faces towards a parent or care giver. This orientation is more suitable for infants below the age of about 12 months who are comforted by visual connection with the adult. The seat is shown in an open condition in FIG. 6 and a closed condition in FIG. 7 in which the seat back 16 has been rotated by about 90° relative to the seat base 14 whilst the seat base remains in a stationary position. In alternative arrangements, both the seat back and the seat base may pivot, rather than the seat base remaining stationary as illustrated.

In order to close the seat 12 from an open condition to a closed condition, the seat back 16 is pivoted in a forwards direction with respect to the normal direction of travel when the seat is in the forwards facing orientation and in a rearwards direction when the seat is in the rearward facing orientation. When the seat is closed, the seat back 16 and seat base 14 have a generally parallel relationship, since this relationship allows the seat to occupy the minimum amount of space when it is folded. Depending on the exact construction of the seat or buggy the relative position of the seat back and seat base in the folded condition may be slightly off parallel, for example about 10° to 20° from parallel.

As illustrated in FIGS. 2 and 7, in the forwards facing orientation, the folded seat (i.e. seat base and seat back) extends forwards at an angle of about 15° to 20° to the horizontal and in the rearwards facing orientation, the folded seat extends rearwards at an angle of about 15° to 20° to the horizontal. The angle of the folded seat may differ from that illustrated and depends on the angle of the seat base 14 in the open condition of the seat, which is typically selected so that a child in the seat leans backwards towards the seat back.

A carriage 18 is arranged for receiving the seat 12 and mounting the seat to a frame 20 of the apparatus 10 in the forward facing and the rearward facing orientations of the seat. The seat can be locked in position on the carriage by any suitable means, provided that such means enable the seat to be mounted in both forward and rearward facing orientations. The carriage comprises a carriage mount co-operable with a seat mount of the seat for mounting the seat to the carriage in forward facing and rearward facing orientations. The way in which the seat is received in the carriage is described in more detail with reference to FIG. 11 onwards.

The frame in the illustrated embodiment comprises a handle member 22 having an inverted U-shape, and on each of the left and right sides of the frame, a rear leg 24 and a front leg 26. Wheels are mounted at the lower end portions of the four legs. The frame is generally symmetrical on either side of a central longitudinal plane taken through the apparatus. The frame can take other configurations.

The carriage 18 is mounted to the frame for pivotal movement. In the illustrated embodiment, the carriage is pivotal about a pivot axis formed by one or more pivot pins 28 fixed relative to the front legs 26. The pivot pins are mounted on short struts 30 (labelled in FIGS. 1 and 11) extending rearwards from the front legs.

The pivotal axis of the carriage defined by the pivot pins 28 is spaced apart from the pivotal axis of the seat 12 between the seat back 16 and seat base 14. The spaced apart arrangement is to locate the seat in the correct position with respect to the frame so that a center of mass of a child in the seat is located in a preferred position and preferably centrally in the frame for stability.

The carriage 18 is arranged for transferring the seat 12 between a forward facing unfolded position (shown in FIG. 2) and a forward facing folded position (shown in FIG. 3) and between a rearward facing unfolded position (shown in FIG. 7) and a rearward facing folded position (shown in FIG. 8) of the seat relative to the frame 20. The forward facing folded position and the rearward facing folded position are different from each other so that dependent on the orientation of the seat in the frame the seat folds to different positions.

For clarity, the seat 12 has open and closed conditions which refer to the seat back being in an open or closed position relative to the seat base. The relative position of the seat back to the base remains the same in the open and closed conditions whether the seat is in a forward facing orientation or rearward facing orientation. However, the seat as an assembly, including the seat back and seat base, is moved between folded and unfolded positions relative to the frame. Additionally, the folded and unfolded positions of the seat are different dependent on whether the seat is in a forward facing orientation or rearward facing orientation.

When the seat has been closed but not yet folded, the seat is positioned relative to the frame in a forward facing unfolded position which is generally diametrically opposed to the position of the seat when in the rearward facing unfolded position (compare FIGS. 2 and 7). In the former, the seat extends generally forwards from the pivotal axis of the seat and in the latter the seat extends generally rearwards, or the positions are displaced by around 180° from each other (or more precisely by about 150-170°). The seat is folded in a forwards direction (anti-clockwise as shown) by about 45° from the forward facing unfolded position to the forward facing folded position (compare FIGS. 2 and 3). The seat is also folded in a forwards direction (anti-clockwise as shown) by about 180° from the rearward facing unfolded position to the rearward facing folded position (compare FIGS. 7 and 8). In this way, the forward facing and rearward facing folded positions of the seat assembly as a whole are generally similar with respect to the frame which in the present embodiment is proximate the front legs 26 (albeit the seat base and seat back are inverted between folded positions).

Figure 3:
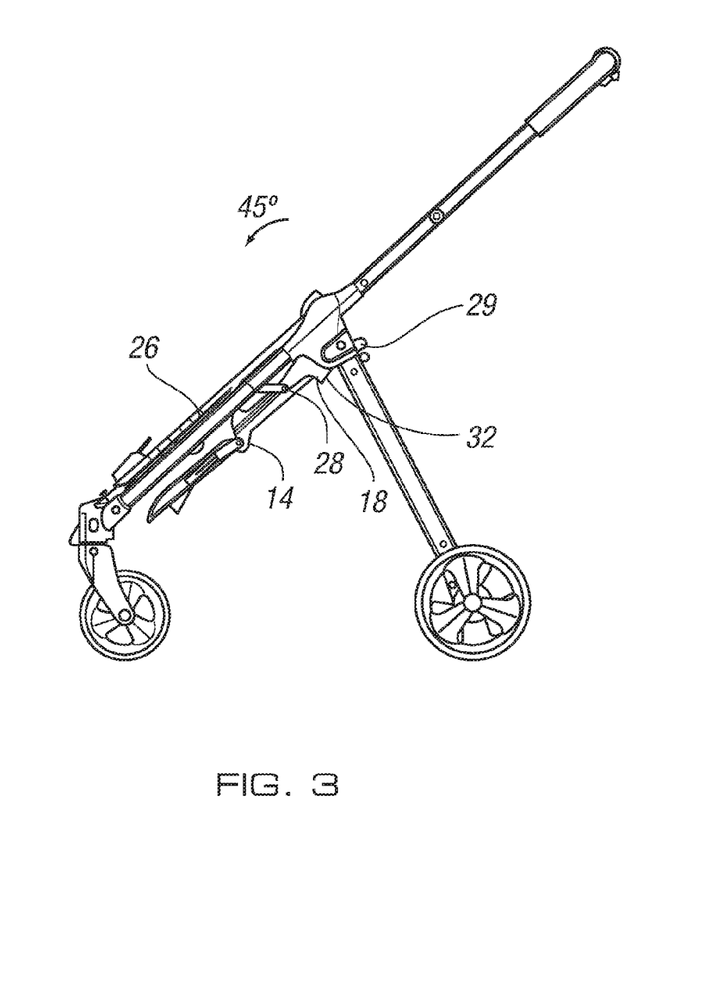
Figure 8:
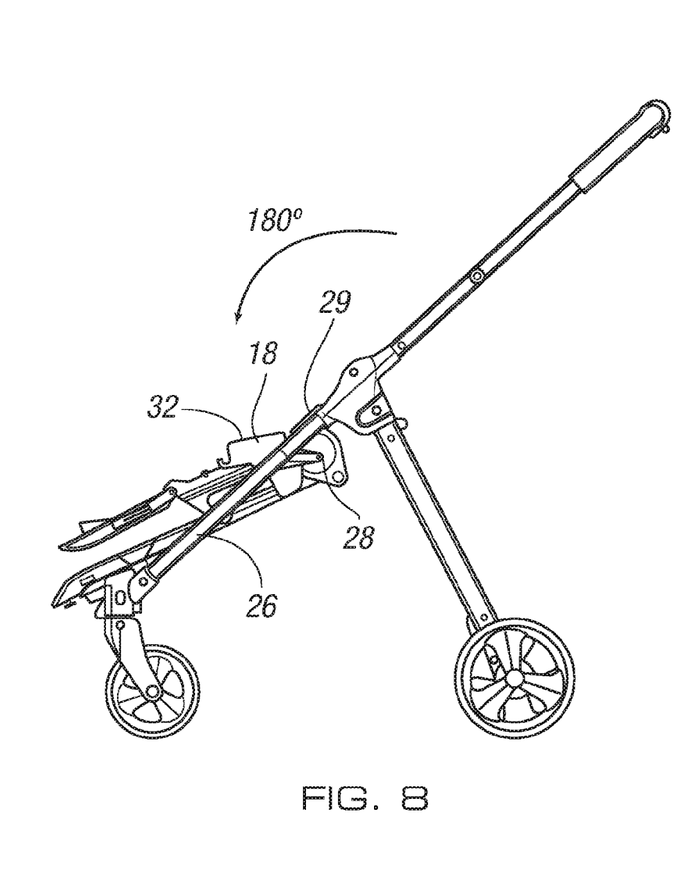

Therefore, referring to FIGS. 3 and 8, the carriage is pivotal by a first, relatively smaller, angle from the forward facing unfolded position to the forward facing folded position of the seat and a second, relatively larger, angle by which the carriage is pivotal from the rearward facing unfolded position to the rearward facing folded position of the seat. The second angle is larger than the first angle by about 120 to 180° and in the illustration is about 135°.

In order to compensate for the different unfolded positions of the seat 12, the carriage 18 has an orientation relative to the frame 20 in the rearward facing folded position of the seat which is inverted relative to an orientation of the carriage in the forward facing folded position of the seat. In the illustrations, a lower surface 32 of the carriage 18 faces downwards and is generally horizontal in both unfolded positions, and faces downwards at an angle of about 45° in the forward facing folded position and faces upwards at an angle of about 20° to the horizontal in the rearward facing folded position.

It will also be noted that as the carriage is inverted dependent on the orientation of the seat, the seat back is located above the seat base in the forward facing folded position and the seat base is located above the seat back in the rearward facing folded position with respect to an upright orientation of the frame. The upright orientation of the frame is in normal use when the frame is unfolded and the seat open for receiving a child.

The seat assembly 12 is generally parallel to the front leg 26 in the forward facing folded position as shown in FIG. 3 and is at an angle of about 10 to 20° in the rearward facing folded position as shown in FIG. 8. The generally parallel arrangement of the seat assembly with the front leg in both folded positions allows a more compact fold. Additionally, the forward facing folded position is generally the same as the rearward facing folded position in the frame allowing the frame itself to be folded in a similar manner independent of whether the seat is in a rearward facing orientation or forward facing orientation.

FIGS. 1 to 3 and 6 to 8 show closing of the seat from the open condition and movement of the seat assembly from the unfolded positions to the folded positions. In the present example, the frame 20 remains unfolded throughout these steps. The method for folding the frame as described below is the same independent of the orientation of the seat with respect to the frame.

As described above, the frame 20 comprises a handle member 22, rear legs 24 and front legs 26. These frame members are pivotally mounted to one another by a hinge assembly 34. The handle member and the front legs are pivotal about a first pivot axis formed by two pivot pins 36, one on each side of the frame assembly. The rear legs are pivotal about a second pivot axis 38 formed by a pair of pivot pins (not shown) on each side of the frame assembly.

Figure 4:
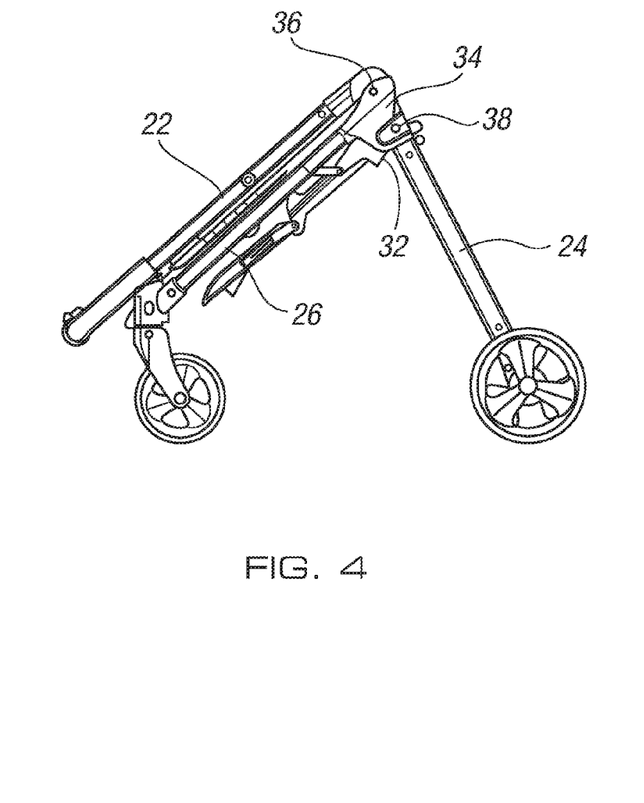
Figure 5:
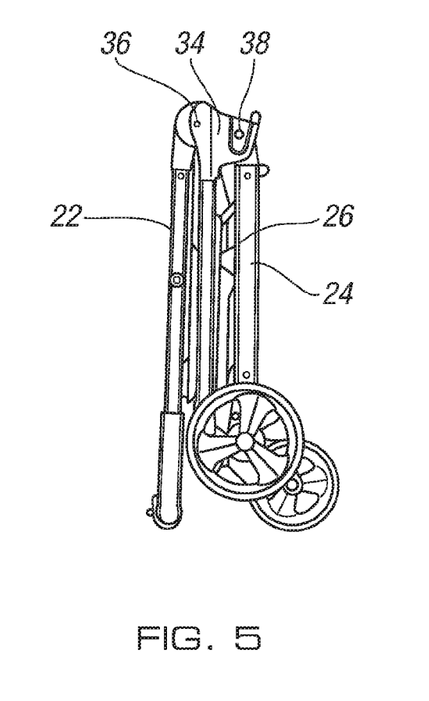
Figure 9:
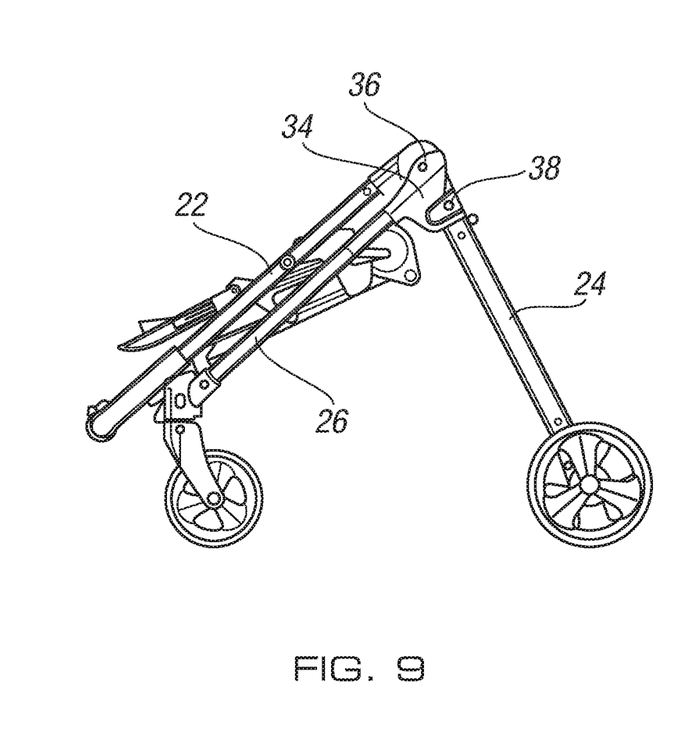
Figure 10:
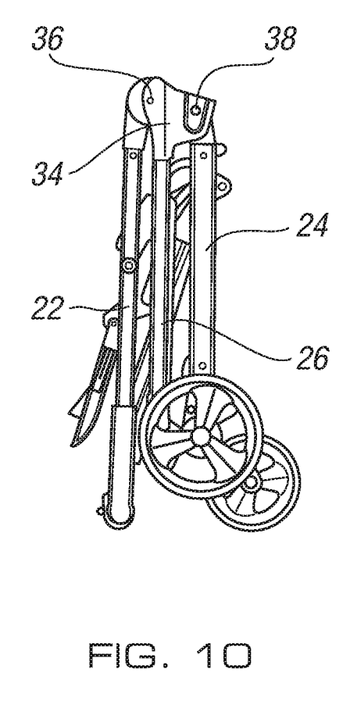

In FIGS. 4 and 9 the handle member 22 is pivoted about first pivot axis 36 from an unfolded position in which it is located on an opposite side of the hinge assembly 34 to the front legs 26 to a folded position in which the handle and the front legs are located on the same side of the hinge assembly and in a generally parallel relationship. In FIGS. 5 and 10, the rear legs 24 are pivoted about the second pivot axis 38 from an unfolded position perpendicular to the handle and front legs to a folded position in a generally parallel relationship with the handle and front legs. In the completed fold the frame members are all arranged in a parallel relationship producing a compact fold.

The illustrated frame 20 is capable of producing a compact fold and is simple in structure, but the present invention is not limited to the illustrated frame. Other types of buggy or pushchair frames could be adopted with the seat and carriage arrangement as described.

However, the case of the illustrated frame provides a stable folding method. When unfolded and in use the handle member and the front leg members extend on generally opposite sides of the pivot. The longitudinal axes of these members are aligned and extend in diametrically opposed directions. When in a fully folded condition, the frame members are located on the same side of the pivot with the front leg members located between the handle member and rear leg members. That is, the front leg members are sandwiched between the handle member and the rear leg members.

The frame folding process has two steps. In a first step, the handle member is unlocked and folded over its pivotal axis by approximately 180° to lie adjacent and generally parallel to the front leg members, as shown in FIGS. 4 and 9. In this partially unfolded condition, the front and rear leg members are maintained in their unfolded positions and the frame as a whole remains stable on the ground, even though folding the handle member unlocks the front and rear legs for pivotal movement. The seat is mounted on the carriage and the carriage is pivotal to the forward facing folded position or the rearward facing folded position independent from pivotal movement of any one of the frame members relative to another of the frame members. As described in detail above, the carriage may be rotated to a folded position prior to folding the handle member of the frame or alternatively the handle member of the frame can be folded prior to folding the carriage. In either case, the handle member and carriage are pivotal to their respective folded positions whilst the front and rear leg members are maintained in their unfolded positions. Whilst the carriage is pivotal independently from the frame members, pivotal movement of the carriage is locked when the seat base and seat back are in an open condition and unlocked when they are in a closed condition. Therefore, pivotal movement of the carriage is dependent on the relative positions of the seat base and seat back.

In the known City Versa buggy discussed in the introduction the seat is pivotal relative to the frame but it is locked in position when the front and rear legs are in an unfolded condition. Folding the front and rear legs unlocks the seat to allow it to pivot. Therefore, pivotal movement of the seat is dependent on the position of the frame members, namely whether they are in unfolded or folded positions. The frame and seat of the City Versa are fully folded by lifting a strap attached between left and right frame members in the region of the frame pivot. Lifting the strap causes the front and rear legs to swing together under gravity, thereby unlocking the seat so that it may also move a small amount into its folded position. Allowing the members to fold under gravity lacks control.

In the illustrated arrangement, the seat comprises a seat base handle 29 labelled in FIGS. 2 and 3, and FIGS. 7 and 8. The seat handle 29 is for gripping by a user when the seat is in either the forward facing or rearward facing folded positions for lifting the seat and allowing the front and rear legs to fold. The handle is fixed to a rear portion of the seat base and is formed by an integral molding with the seat base. Alternatively, the handle may be formed at the lower portion of the seat back and molded with the seat back, or integral with the carriage. This arrangement allows greater control of the folding process because the handle is fixed and sturdy (unlike a strap).

The seat handle 29 is located underneath, or generally at a lower portion of, the seat when the apparatus is in use and when the seat is closed and transferred to either the forward facing or rearward facing folded positions (i.e. inverted) the seat handle is exposed upwardly for gripping by a user and lifting the seat to fold the frame.

Additionally, the seat handle 29 is located at the rear of the seat assembly when the seat is in the forward facing orientation and in normal use. Therefore when the carriage has been folded to the position shown in FIG. 3 the seat handle 29 is readily accessible to a user since users normally locate themselves at the rear of a buggy for pulling and pushing the buggy by the handle member 22. When the seat assembly is in a rearward facing orientation and the seat is closed as shown in FIG. 7, the seat handle 29 extends forwards and is located away from the normal position of a user. However even though this is an inconvenient location of the seat handle, the act of folding the carriage to the position shown in FIG. 8 moves the seat handle so that it projects rearwards and is readily accessible for grasping by a user.

The stability of the apparatus is enhanced by the position of the seat 12 and carriage 18 relative to the frame 20. The seat back is pivotal relative to the seat base about a seat pivot and the seat pivot is located below the frame pivot 36 when the apparatus is unfolded and in normal use. This position of the seat lowers the center of gravity of the apparatus improving stability. In many known buggies the seat pivot is aligned with the frame pivot which results in a relatively high center of gravity and reduced stability. The present arrangement comprises a carriage pivotally mounted to the frame about a carriage pivot for mounting the seat to the frame in forward facing and rearward facing orientations. The carriage pivot 28 is located below the frame pivot 36 when the apparatus is unfolded and in normal use. The positioning of the carriage pivot below the frame pivot allows the center of gravity to be lowered. As illustrated, the carriage pivot is located below the frame pivot by fixing the carriage pivot in the frame relative to the front leg members on struts extending rearwards from respective front leg members. Alternatively the carriage pivot can be located on the front leg members or on the rear leg members.

Figure 11:
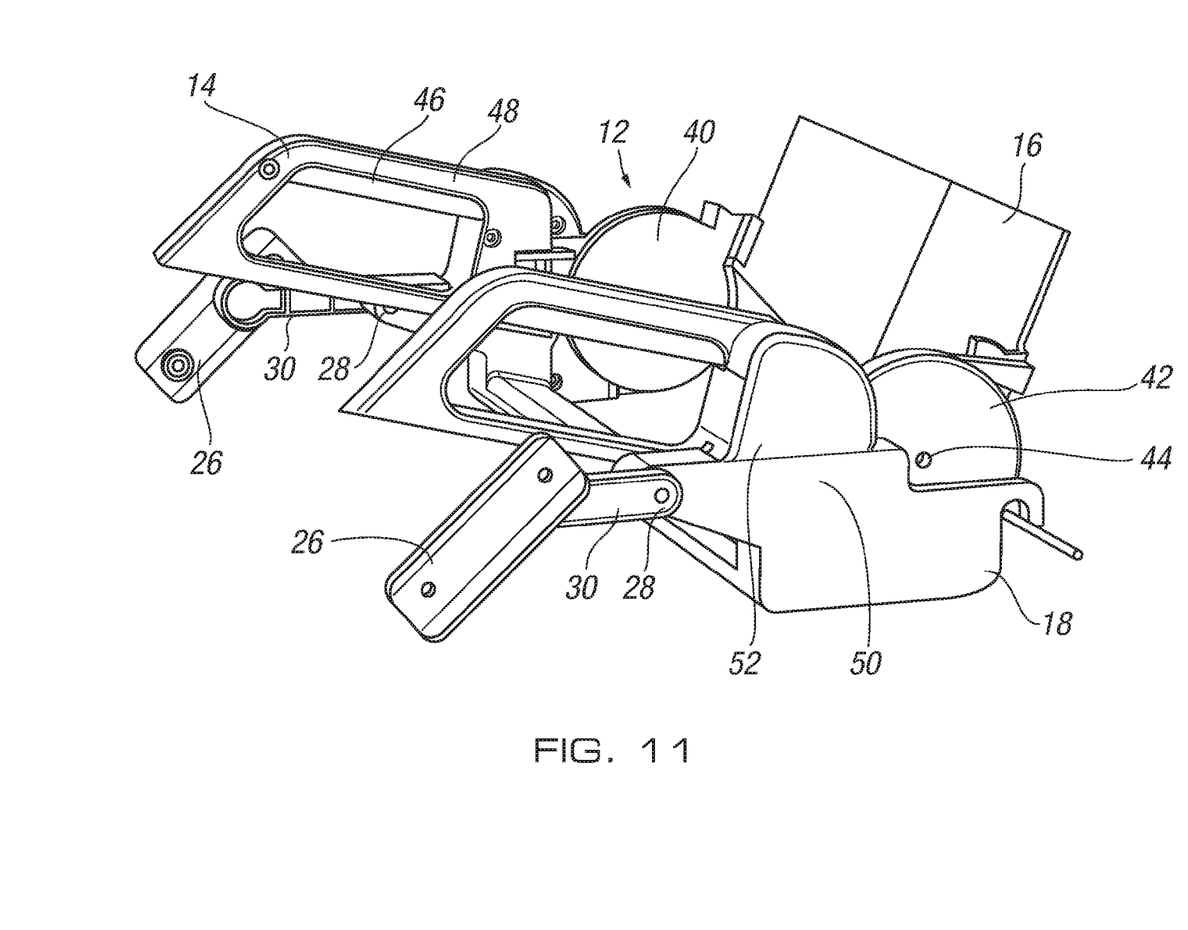
FIG. 11 shows an enlarged portion of the apparatus in more detail.

FIG. 11 shows the seat 12 and carriage 18 in more detail and in particular the way in which the seat is mounted to the carriage and the carriage is mounted to the frame 20.

Figures 13, 14:
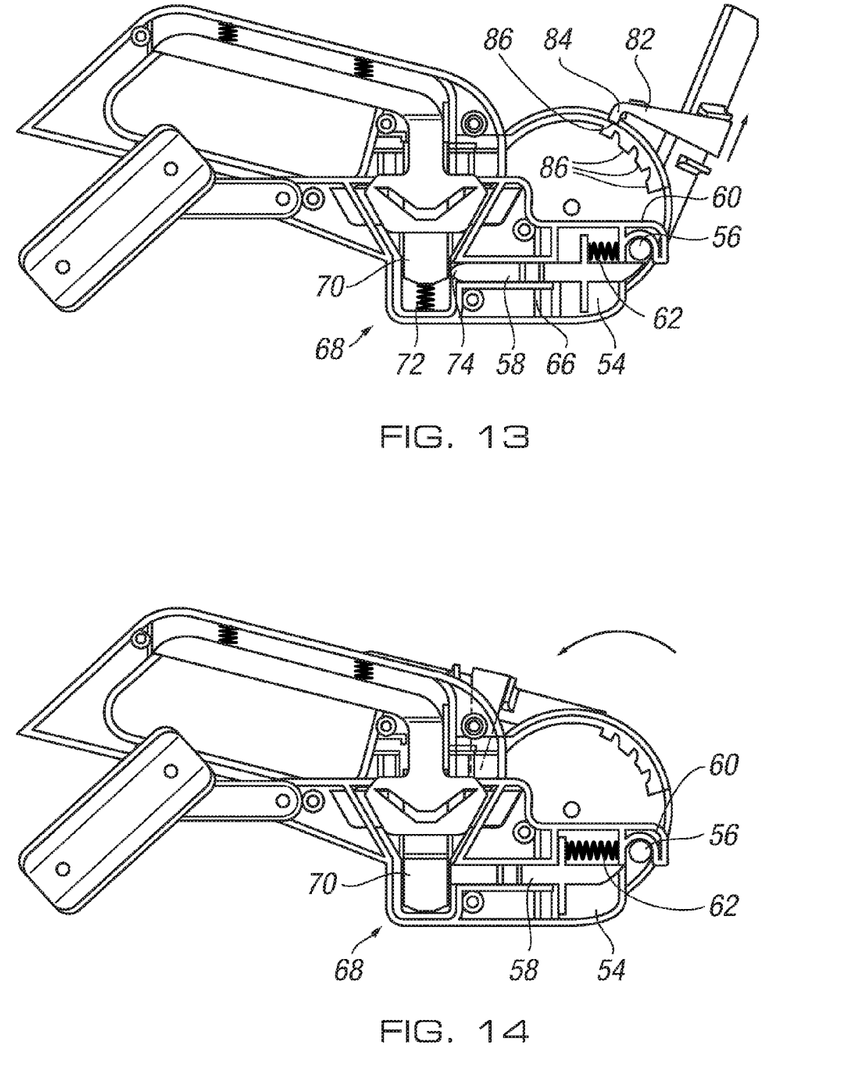
FIGS. 13 and 14 show in more detail a locking mechanism for locking a seat and carriage arrangement to a frame of the apparatus.

The seat back 16 of the seat 12 is pivotal relative to the seat base 14 between at least one open condition (one of which is shown in FIG. 11) for seating a child when the apparatus is unfolded and a closed condition (as shown in FIG. 14) when the apparatus is folded. Although omitted in FIG. 11 the seat base comprises a generally planar member on which a child may be seated, as shown in FIGS. 1 to 10. The seat back comprises a hub 40 engaged with a hub 42 of the seat base for relative pivotal movement about a pivot axis 44. The seat base 14 comprises a pair of handles 46 for lifting the seat 12 and for placing the seat 12 in the carriage 18. The handles comprise a release mechanism 48 operable for releasing the seat when it is mounted in the carriage.

The carriage 18 comprises a carriage mount 50 for receiving a seat mount 52 of the seat and mounting the seat to a frame of the apparatus. As previously described with reference to FIGS. 1 to 10, the carriage is mounted to the frame for pivotal movement for transferring the seat between an unfolded position (as shown in FIG. 11) and a folded position. The carriage is pivotal about pivot pins 28 fixed to the front legs 26 of the frame by struts 30. As the carriage is pivotally mounted to the frame and the carriage carries the seat, the carriage is locked to the frame to prevent pivotal movement of the carriage when the seat back is in said at least one open condition. A child may be seated in the seat when the seat is open and pivotal movement of the seat could expel the child from the seat potentially causing harm or injury. In the present arrangement, the carriage is locked to the frame automatically when the seat back is pivoted to an open condition. Conversely, the carriage is unlocked from the frame to allow pivotal movement of the carriage to the folded position of the seat when the seat back is moved to the closed condition. Once the seat is closed it is not possible to seat a child in the seat and therefore the carriage is automatically unlocked from the frame when the seat is closed to allow folding.

The carriage mount 50 and the seat mount 52 are co-operable to mount the seat in the carriage in both the forward facing and rearward facing orientations. Therefore when the seat is open in either the forward facing or rearward facing orientations pivotal movement of the carriage and the seat is prevented to avoid any potential harm or injury to a child in the seat.

Figure 12:
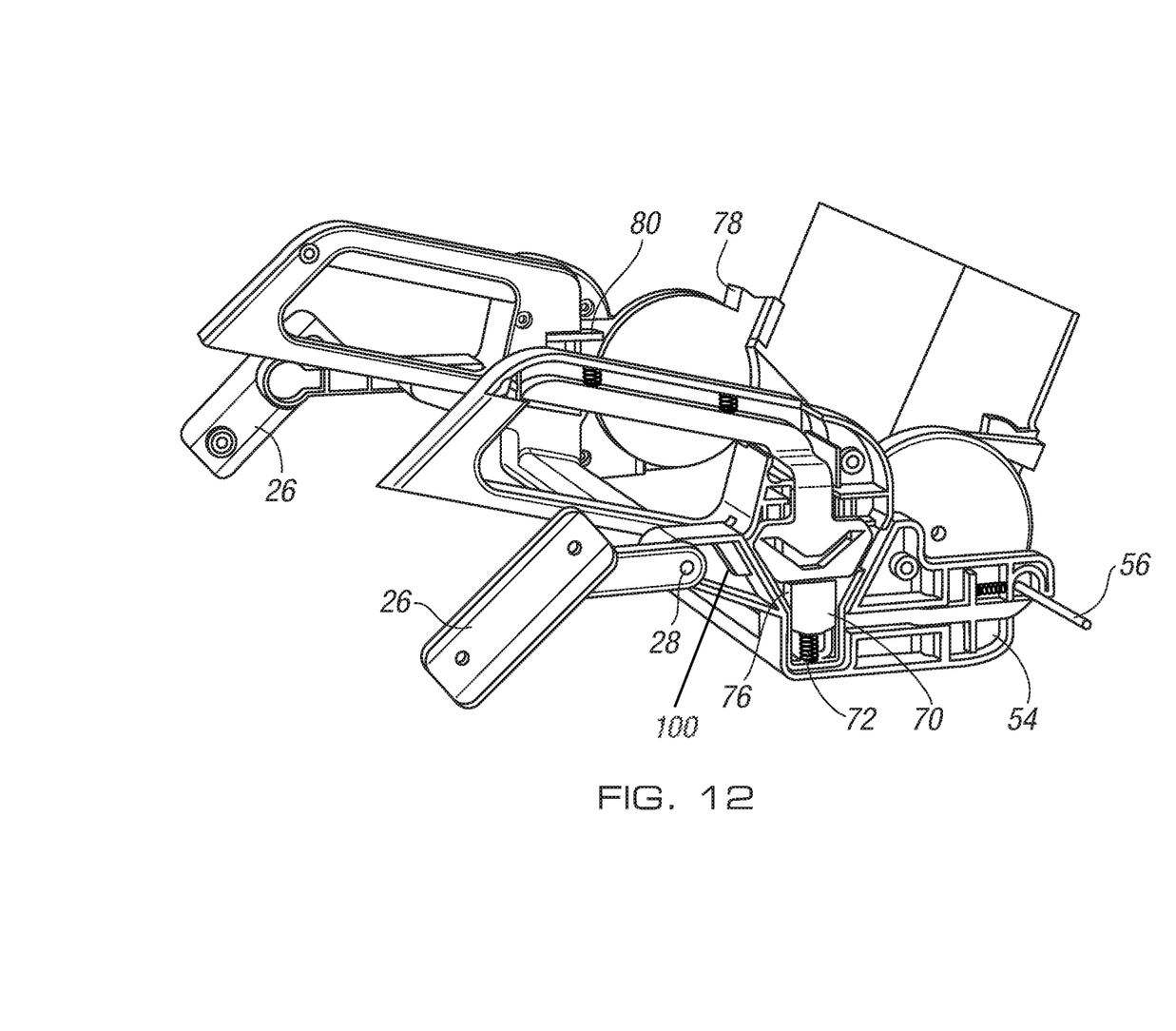
FIG. 12 shows the enlarged portion with the internal mechanism exposed for explanation.

FIG. 12 shows the seat 12 and carriage 18 with the internal mechanisms exposed by removal of part of the outer housing. The carriage comprises a carriage locking mechanism 54 responsive to the position of the seat back 16 relative to the seat base 12 for engaging a frame member 56 for locking the carriage to the frame 20 and for disengaging from the frame member for unlocking the carriage from the frame. In one example the frame member is a transverse bar extending between the left and right rear legs 24 and in the illustrated example the frame member comprises two pins extending inwardly from respective rear legs. The locking mechanism 54 is arranged on each of the left and right sides of the frame and carriage although only the left hand side arrangement is shown in the Figures.

FIGS. 13 and 14 show elevational views of the seat and carriage. In FIG. 13 the locking mechanism 54 is engaged with the frame member 56 and in FIG. 14 the locking mechanism is disengaged from the frame member. Whether the carriage 18 is locked or unlocked from the frame the carriage comprises a supporting portion 60 for receiving the frame members and supporting a rearward portion of the carriage on the frame members against further clockwise pivotal movement (as shown). The supporting portion 60 is open at its lower end to allow the carriage to be pivoted in a forwards direction, or anticlockwise direction (as shown) when it is unlocked.

The carriage locking mechanism 54 comprises a locking member 58 having a locking position (shown in FIG. 13) for engaging the frame member 56 for locking the carriage to the frame and an unlocking position (shown in FIG. 14) for disengaging from the frame member for unlocking the carriage from the frame, and the seat comprises a seat locking mechanism for engaging with the carriage locking mechanism for causing movement of the locking member. Movement of the locking member 58 is biased by a biasing member 62 (a helical spring in this example) and movement of the seat back to close the seat causes the seat locking mechanism to move the locking member in the direction of the bias. In the present arrangement, the locking member is biased into the unlocked position. The locking member 58 is received for sliding movement in the carriage and comprises two lateral arms 64 for engaging with a shoulder 66 of the carriage for limiting sliding movement away from the locking position.

The seat 12 comprises a seat locking mechanism 68, which comprises an actuator member 70 moveable between locking and unlocking positions for transferring movement of the seat back to movement of the locking member 58 of the carriage locking mechanism 54. The helical spring 62 biases the locking member 58 into engagement with the actuator member 70 so it is responsive to movement of the actuator member. The actuator member 70 is biased by a biasing member 72 (a helical spring as illustrated) into the locking position and movement of the seat back to the closed position causes the actuator member to move against the bias. Therefore, the actuator member is biased to the locking position so that the locking member 58 is biased into the locking position so that default condition is that the seat is fixed to the frame.

When the seat back 16 is in the open condition, the actuator member 70 is moved to an upward locking position (as shown in FIG. 13) under the bias of the springs 72. The actuator member 70 has a tapered surface (not shown) for engaging a forward end 74 of the locking member 58 such that movement of the actuator member in an upward direction is translated to movement of the locking member in a rearwards direction. When the seat back is closed the actuator member is moved in a downwards direction to the position shown in FIG 14, allowing the locking member 58 to move under the bias of spring 62 so that the forward end 74 is received in a recess, or opening, 76 of the actuator member. The recess 76 is shown partially in FIG. 12 and extends across the inner face of the actuator member. The recess 76 comprises the above mentioned tapered surface at its rear end.

Referring to FIG. 12, the seat back 16 comprises a locking surface 78 for engaging with a locking tab 80 of the actuator member 70. In the illustrated open condition of the seat back the locking surface is disengaged from the locking tab so that the actuator member can move under the bias of spring 72 to an upwards position whereby the carriage 18 is locked to the frame 20. Pivotal movement of the seat back (in a counter-clockwise direction as shown) to the closed condition causes the locking surface to engage the locking tab moving the actuator member against the bias of this spring 72 to a lower position whereby the carriage is unlocked from the frame. The relative positioning of the locking surface 78 and locking tab 80 is selected such that the locking service engages with the locking tab only when the seat back is almost closed so that a small amount of pivotal movement of the seat back from the open condition does not accidentally cause the carriage to be unlocked.

The seat 12 has a plurality of open conditions in which a child may be seated in the seat and the carriage is locked to the frame in each of the open conditions. The angle of the seat back 16 to the seat base 14 is different in the open positions so that the seat can be changed from an upright open condition to one or more reclined open conditions. In the illustrated example as shown in particular in FIG. 13, the seat comprises a reclining mechanism by which the angle of the seat back can be locked relative to the seat base. A seat back locking member 82 is movable between locking and unlocking positions for locking and unlocking pivotal movement of the seat back. The locking member 82 comprises a locking tab 84 which can engage with any one of a plurality of seat base notches 86 spaced about the circumference of the hub 42 of the seat base. The locking member 82 is moved in an upwards direction as shown in FIG. 13 to unlock the seat back from the seat base and in a downwards direction to lock the locking tab 84 in a selected notch 86. Movement of the locking member is controlled by a user of the buggy from the rear of the seat back. The seat base hub 42 preferably comprises a further notch with which the locking tab 84 engages when the seat back is pivoted to a fully closed position to lock the seat back in the closed position. This arrangement prevents the seat back from pivoting away from the seat base when the buggy is folded, which could otherwise be inconvenient when handling the folded buggy.

Figure 17:
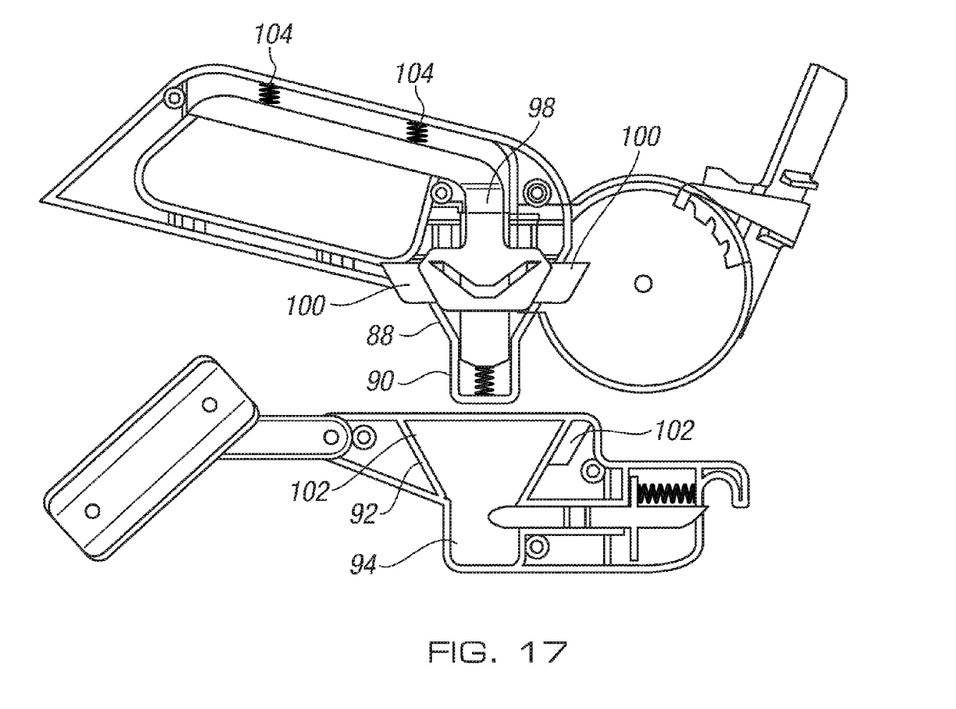

As shown particularly in FIG. 17, the carriage 18 is arranged for receiving the seat and mounting the seat to the frame in a forward facing orientation and a rearward facing orientation. In this regard, the shape of the carriage mount 50 is complementary to the shape of the seat mount 52 whether the seat is forward facing or rearward facing. The external profile of the seat mount 88, 90 matches the internal shape of the carriage mount 92, 94, both having an upper tapered portion 88, 92 and a lower straight portion 90, 94 having forward and rearward surfaces which are mirror images of each other.

Figure 15:
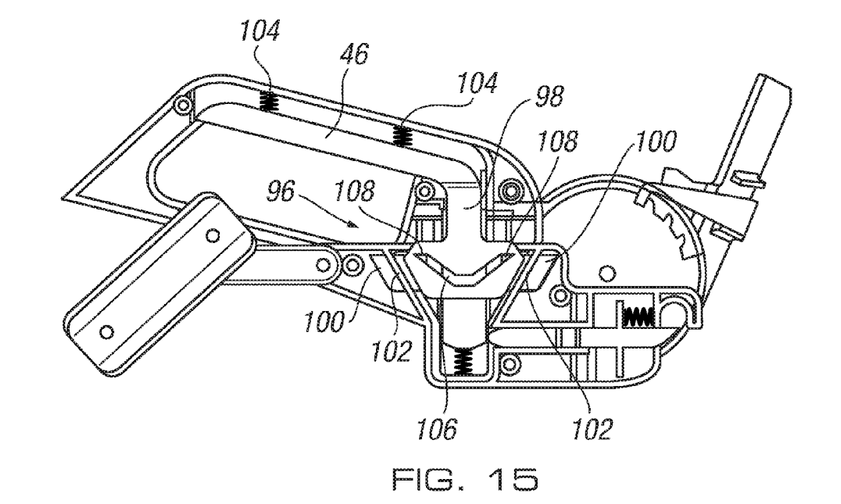
FIGS. 15 to 17 show in more detail an attachment mechanism for attaching the seat to the carriage.
Figure 16:
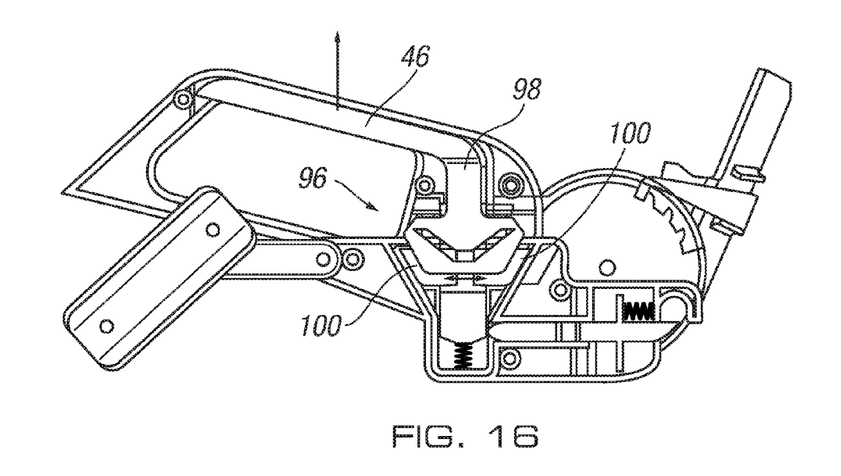

Referring to FIGS. 15 to 17, the seat 12 comprises an attachment mechanism 96 for attaching and locking the seat to the carriage 18. The attachment mechanism comprises a handle member 98 for moving locking parts 100 into and out of locking apertures 102 of the carriage. When the locking parts are received in the locking apertures the seat is locked to the carriage. The handle member 98 comprises a release portion 46 which can be operated by a user for moving the handle member in an upwards direction (as illustrated) against the bias of one or more biasing members, or springs, 104. The biasing members bias the handle member(s) in a downward direction (as illustrated). The lower end portion of the handle member comprises a generally V-shaped cut-out 106. A portion of each of the locking parts 100, in the form of a triangular insert 108, is received in each side of the V-shaped cut-out for sliding movement. Movement of the handle member 98 in an upwards or downwards direction causes the triangular inserts to slide along the cut-out thereby translating movement of the handle member to perpendicular movement of the locking parts into and out of the locking apertures.

As shown in FIG. 17, when the seat is removed from the carriage the biasing members 104 bias the handle member 98 in the downwards direction causing the triangular inserts to extend the locking parts 100 outwardly to their locking positions. A user then aligns the seat with the carriage and inserts the seat mount 52 into the carriage mount 50. The tapered surfaces 92 of the carriage move the locking parts inwardly, which also move the handle member upwards against the bias of the springs 104. When the locking parts are aligned with the locking apertures the biasing force of the spring causes the locking parts to move outwardly into engagement with the locking apertures, as shown in FIG. 15, thereby locking the seat to the carriage.

If a user wishes to dismount the seat 12 from the carriage 18, the release portion 46 is squeezed moving the handle member 98 in an upwards direction as indicated by the arrow in FIG. 16. This movement causes the triangular inserts 108 to slide to the central portion of the V-shaped cut-out 106 drawing the locking parts 100 inwards and out of engagement with the locking recesses 102. The seat can then be lifted away from the carriage.

FIGS. 15 to 17 show the seat mounted in a forward facing orientation in the carriage. However, the symmetry of the attachment mechanism 96 means that the process for attaching and detaching the seat from the carriage is the same in a rearward facing orientation, except that the locking parts 100 engage with opposite locking apertures 102 in the rearward facing orientation.

The seat assembly shown in the drawings is a pushchair seat assembly, and is designed to function with other parts of the apparatus (including the carriage and frame), in the various ways described above. It is particularly useful to parents and care givers, if the apparatus is compatible with car seat assemblies or other types of seat assemblies. In the present arrangement, a child car seat comprises a seat which can be either attached directly to the car or to a seat base which is attached to the car. The seat may be lifted or removed from the car or from the car seat base by a parent or care giver and then located with and fixed to the carriage mount of the illustrated apparatus. Although not shown in the drawings the car seat may comprise means for cooperating with the carriage for locking the carriage in its unfolded conditions.

There have been described and illustrated herein several embodiments of a foldable child support apparatus. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A foldable child support apparatus comprising:
   a seat having a seat back pivotal relative to a seat base between at least one open condition for seating a child when the apparatus is unfolded and a closed condition when the apparatus is folded;
   a frame comprising a handle member, front leg members and rear leg members, said front leg members, said rear leg members and said handle member being pivotal about at least one frame pivot between an unfolded condition in which the handle member and the front leg members extend on generally opposite sides of the at least one frame pivot and a folded condition in which the front leg members, rear leg members and handle member are located on the same side of the at least one frame pivot with the front leg members located between the handle member and rear leg members;

the frame being arranged to support the seat in a forward facing orientation in which said seat base projects forwardly with respect to said seat back and a rearward facing orientation in which said base projects rearwardly with respect to said seat back and to transfer the seat between a forward facing unfolded position and a forward facing folded position and between a rearward facing unfolded position and a rearward facing folded position.

2. The apparatus claimed in claim 1, further comprising:
a carriage pivotally mounted to said frame about a carriage pivot,
wherein the seat back is pivotal relative to the seat base about a seat pivot and the seat pivot is located below said at least one frame pivot when the apparatus is unfolded and in normal use, and said carriage pivotally mounts the seat to the frame in forward facing and rearward facing orientations, the carriage pivot being located below said at least one frame pivot.

3. The apparatus claimed in claim 2, wherein:
the carriage pivots comprises respective pivots located on respective struts extending rearwards from said front leg members.

4. The apparatus claimed in claim 2, wherein:
the carriage is pivotal about said carriage pivot to transfer said seat to the forward facing folded position or the rearward facing folded position independently of movement of the frame.

5. The apparatus claimed in claim 1, wherein:
the seat comprises a seat handle for gripping by a user when the seat is in either the forward facing position or the rearward facing folded positions and lifting the seat by the seat handle when the handle member of the frame is in said folded condition causes folding of the front and rear leg members to said folded condition.

6. The apparatus claimed in claim 1, further comprising:
a carriage for receiving the seat and mounting the seat to said frame in said forward facing and rearward facing orientations of the seat,
wherein the carriage is supported by the frame for pivotal movement relative to said frame for transferring the seat between said forward facing unfolded position and said forward facing folded position and between said rearward facing unfolded position and said rearward facing folded position.

7. The apparatus claimed in claim 6, wherein:
the carriage is supported for pivotal movement independent of movement of the frame.

8. The apparatus claimed in claim 7, wherein:
the carriage has an orientation relative to the frame when said seat is in the rearward facing folded position which is inverted relative to an orientation of the carriage when said seat is in the forward facing folded position whereby a surface of said carriage that faces downwardly when said seat is in the forward facing folded position faces upwardly when said seat is in the rearward facing folded position.

9. The apparatus claimed in claim 8, wherein:
the carriage is pivotal in the same direction both from the forward facing unfolded position to the forward facing folded position of the seat and from the rearward facing unfolded position to the rearward facing folded position of the seat.

10. The apparatus claimed in claim 9, wherein:
the carriage is pivotal by a first relatively smaller angle when pivoting from the forward facing unfolded position to the forward facing folded position of the seat and a second relatively larger angle when pivoting from the rearward facing unfolded position to the rearward facing folded position of the seat.

11. The apparatus claimed in claim 10, wherein:
the second angle is between 120 and 180 degrees larger than the first angle.

12. The apparatus claimed in claim 1, wherein:
in the forward facing orientation of the seat the seat back is pivotal in the forwards direction to close the seat and in the rearward facing orientation the seat back is pivotal in a rearwards direction to close the seat, and
with respect to an upright orientation of the frame, the seat back is located above the seat base in the forward facing folded position and the seat base is located above the seat back in the rearward facing folded position.

13. The apparatus claimed in claim 1, further comprising:
a carriage for receiving the seat and mounting the seat to said frame, the carriage being mounted to the frame for pivotal movement for transferring the seat between said unfolded positions and said folded positions, wherein the carriage is locked to the frame to prevent pivotal movement of the carriage when the seat back is in said at least one open condition.

14. The apparatus claimed in claim 13, wherein:
the carriage is unlocked from the frame to allow pivotal movement of the carriage to the folded position of the seat when the seat back is moved to the closed condition.

15. The apparatus claimed in claim 14, wherein:
the carriage comprises a carriage locking mechanism responsive to the position of the seat back relative to the seat base for engaging a frame member for locking the carriage to the frame and for disengaging from the frame member for unlocking the carriage from the frame.

16. The apparatus claimed in claim 15, wherein:
the carriage locking mechanism comprises a locking member having a locking position for engaging the frame member for locking the carriage to the frame and an unlocking position for disengaging from the frame member for unlocking the carriage from the frame, and
the seat comprises a seat locking mechanism for engaging with the carriage locking mechanism for causing movement of the locking member.

17. The apparatus claimed in claim 16, wherein:
movement of the locking member is biased by a biasing member and movement of the seat back to close the seat causes the seat locking mechanism to move the locking member in the direction of the bias provided by said biasing member.

18. The apparatus claimed in claim 17, wherein:
the carriage is arranged for receiving the seat and mounting the seat to the frame in said forward facing orientation and said rearward facing orientation, and the carriage is locked to the frame to prevent pivotal movement of the carriage when the seat back is in said at least one open condition in the forward facing orientation and the rearward facing orientation.

19. The apparatus claimed in claim 18, wherein:
the seat locking mechanism is co-operable with the carriage locking mechanism to cause the carriage locking mechanism to engage with the frame member to lock the carriage to the frame when the seat back is in said at least one open condition and to disengage from the frame member when the seat back is in the closed condition to allow pivotal movement of the seat to said forward facing folded position or said rearward facing folded position.

* * * * *